Figure 1:
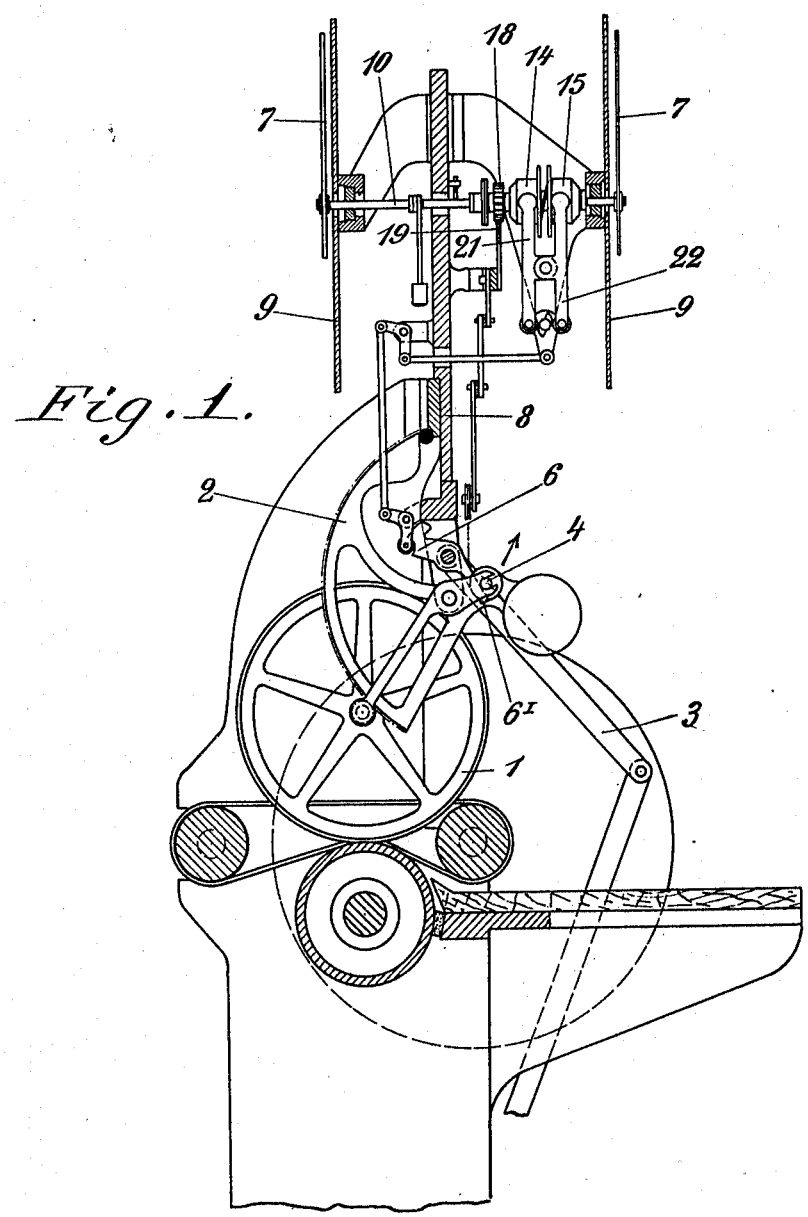

W. A. WÜST.
MACHINE FOR MEASURING THE AREA OF LEATHER OR THE LIKE.
APPLICATION FILED OCT. 17, 1910.

1,003,850.

Patented Sept. 19, 1911.

3 SHEETS—SHEET 1.

WITNESSES:
Charles Junge
Wilhelm Berg

INVENTOR:
Wilhelm Adolf Wüst

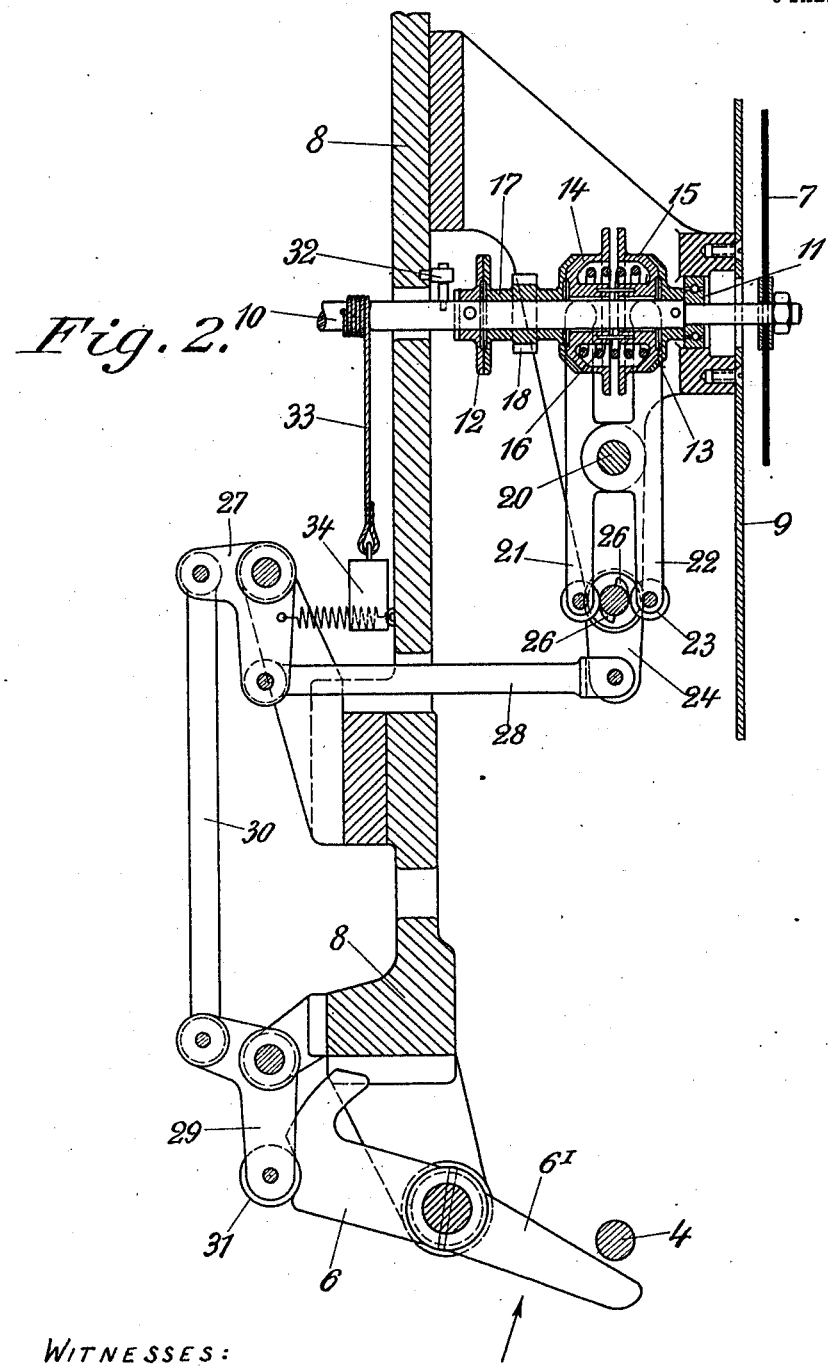

W. A. WÜST.
MACHINE FOR MEASURING THE AREA OF LEATHER OR THE LIKE.
APPLICATION FILED OCT. 17, 1910.
1,003,850.
Patented Sept. 19, 1911
3 SHEETS—SHEET 3.
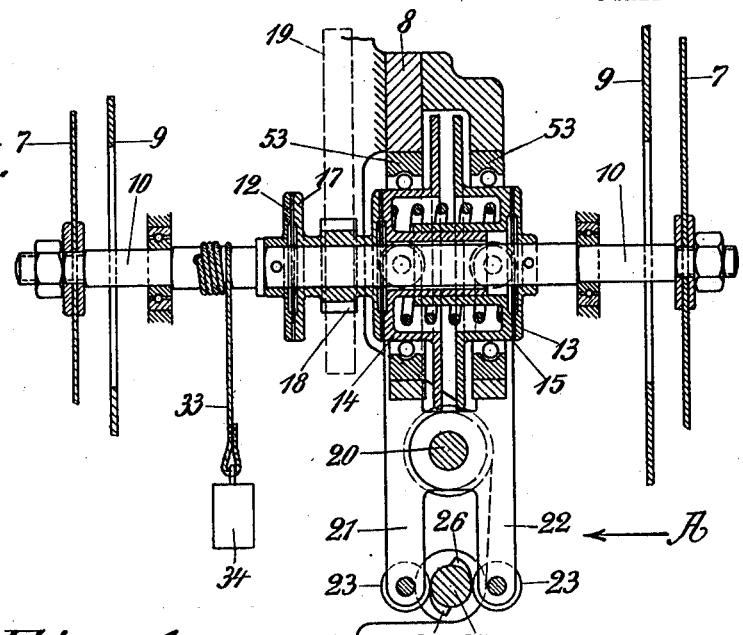
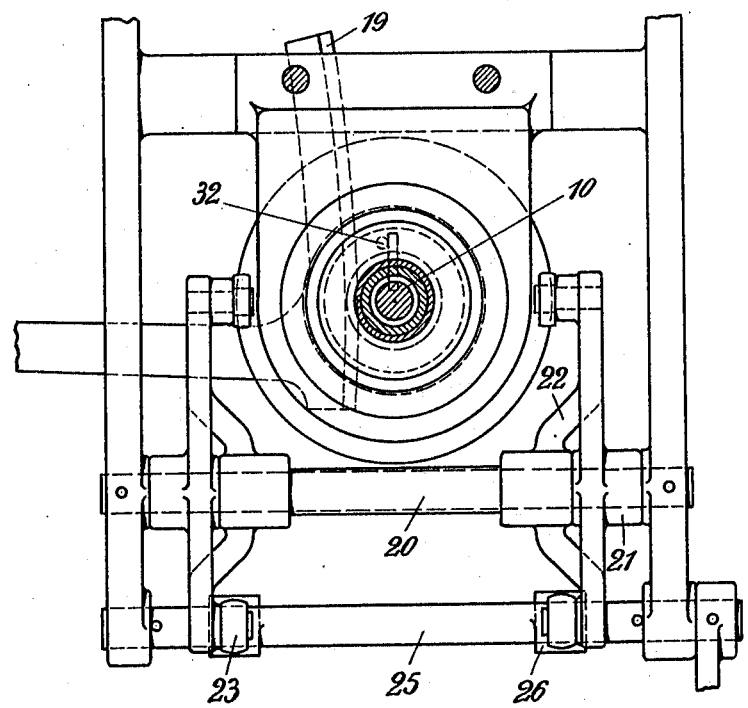
WITNESSES:
INVENTOR:

UNITED STATES PATENT OFFICE.

WILHELM ADOLF WÜST, OF FRANKFORT-ON-THE-MAIN, GERMANY, ASSIGNOR TO MOENUS MACHINE WORKS, OF FRANKFORT-ON-THE-MAIN, GERMANY.

MACHINE FOR MEASURING THE AREA OF LEATHER OR THE LIKE.

1,003,850. Specification of Letters Patent. Patented Sept. 19, 1911.

Application filed October 17, 1910. Serial No. 587,610.

*To all whom it may concern:*

Be it known that I, WILHELM ADOLF WÜST, a subject of the King of Prussia, residing at 56 Moltke Allee, in the city of Frankfort-on-the-Main, Kingdom of Prussia, and Empire of Germany, have invented new and useful Improvements in Machines for Measuring the Area of Leather or the Like, of which the following is a specification.

The invention relates to machines for measuring the area of leather, or the like, and has for its object to improve these machines by counteracting the irregularities and inaccuracies in the working of the same, so that a correct measurement is always arrived at. These irregularities are especially noticeable in those machines in which the measuring devices (measuring wheels) are connected by gearing with the pointer devices (toothed segments) and are temporarily disconnected therefrom after each measuring operation, to bring all the operative parts of the machine back to their original positions.

The changes of position of the measuring and pointer devices, relative to one another and caused by the interaction of the toothed gearing and other parts do not permit the pointer to return to its zero position thus giving rise to incorrect measurements. These disadvantages are completely avoided in the machines hereinafter set forth. After each completed measuring operation the pointer device is brought back to the zero position by a special apparatus and is held in this position, ready for the next operation of the machine, so that a correct measurement is always assured.

In the accompanying drawings Figure 1 is a cross sectional view of the machine. Fig. 2 shows a cross section of a constructional form in which the pointer 7 is screwed firmly to its axis, which can be completely disconnected from its actuating gear. Fig. 3 shows a clutch of slightly different form from that represented in Fig. 1. Fig. 4 is a front view of the devices for engaging the clutch as seen from the direction of the arrow A, Fig. 3.

In the constructional form shown in Fig. 1, the measuring wheels 1 are so arranged that they are moved by and brought into engagement with the toothed segments controlling the pointer device by the material to be measured, as it is introduced. After each complete operation the connection between the measuring wheels and the segments is interrupted by means of a lever 3, actuated by hand or foot, and the machine is prepared for the next operation. This is effected by moving the segments 2 and their axes 4, projecting from the lever 3, upward in the direction indicated by the arrow, thus freeing them from the measuring wheels.

A lever 6 fastened upon the pivot of the lever 3 and rigid therewith controls the special devices of the machine for disconnecting the pointer 7 from its actuating gear, for returning the same to its zero position and for putting it again in gear.

The pointer shaft 10 is carried in bearings—of the ball or center point type, and as nearly frictionless as possible—on the machine frame 8 on which are also arranged the disks 9 engraved with the measuring scales, of which there may be two. The shaft 10 carries two parts, 12 and 13, which form the two halves of a friction clutch. The clutch itself consists of two disks, 14, 15, loose on the shaft 10 and movable toward one another, but held apart by a spring 16. In this way the parts 14 and 15 are pressed against the clutch members 12 and 13 respectively. To reduce as much as possible the friction of the shaft 10 in its bearings, when the clutch is disengaged, the bore of the two disks 14, 15, is made somewhat larger than the diameter of the pointer-shaft.

Between the clutch member 12 and the disk 14 is a distance piece, 17. This distance piece carries a gear wheel 18 which engages with the toothed segment 19 (Fig. 4) actuated by the pointer driving gear, and causes the pointer 7 to effect an oscillating movement, when the clutch 14, 15, 16 presses the distance piece 17 against the clutch member 12, that is, when connection is established between the pointer shaft, 10, and gear wheel 18. The inner and opposite edges of the clutch-disks 14, 15 have extended flanges, against which the rounded ends of two scissor-like levers, 21, 22, connected together and pivoted on a bolt 20 on the machine frame, are brought into contact. On the opposite ends of the levers 21, 22 are rollers 23, between which is pivoted a bolt 25, provided with a lever 24, and having two projections 26. A rod 28 connects the lever 24 with a bell-crank lever 27, which is itself joined to a second bell-crank lever 29 by means of another rod 30. The bell-crank lever 29 carries at one end a roller 31, against which bears one of the cam like arms of the lever 6, pivotally mounted in the frame.

If the toothed segment 2, Fig. 1, with its axis 4 be raised after each complete measuring operation, as already described, the lever 6 receives a turning motion, and causes the bolt 25 to turn, through the action of parts 29, 30, 27, 28, 24. By this means, and through the action of the projections 26, the clutch levers, 21, 22 are so moved that their ends engaging with the clutch disks 14, 15 press the said disks together against the action of the spring 16 and thus liberate the pointer shaft 10, and clutch members 12, 13; in the same manner the distance-piece which revolves freely on the pointer shaft 10 is disengaged from the clutch. Before the pointer-shaft 10 is again connected to its actuating gear (distance piece 17, 18) the pointer 7 is brought back to its zero position, determined by a stop 32, either by means of a balance weight provided on the pointer, or, as is shown in the drawing, by a cord or chain 33 wound around the shaft 10, and carrying weight 34. When this has been effected, the workman removes his foot from the lever actuating the rod 3, which falls by its own weight, bringing the segments 2 again in gear with the measuring wheels 1. The lever 6 having turned so that the raised part of its cam-shaped end has left the roller 31, the gear actuating the clutch returns to its original position under the action of the spring shown on the lever 27. The clutch surfaces engage with one another and connect the pointer-shaft 10 to its actuating gear, the machine being now in a condition ready for the next measuring operation.

I claim—

1. In a machine of the character described, a pointer, measuring wheels, toothed segments, means for moving the segments upward to free them from the measuring wheels, said means embodying a lever, actuating gear for said pointer, a lever mounted upon the pivot of said first-named lever and rigid therewith, and means by which said last-named lever acts upon the actuating gear for disconnecting said pointer from its actuating gear.

2. In a machine of the character described, a pointer, measuring wheels, toothed segments, means for moving the segments upward to free them from the measuring wheels, said means embodying a lever, actuating gear for said pointer, a lever mounted upon the pivot of said first-named lever and rigid therewith, means by which said last-named lever acts upon the actuating gear for disconnecting said pointer from its actuating gear, and clutch levers operatively connected with said last-named lever.

3. In a machine of the character described, a pointer, measuring wheels, toothed segments, means for moving the segments upward to free them from the measuring wheels, said means embodying a lever, actuating gear for said pointer, a lever mounted upon the pivot of said first-named lever and rigid therewith, means by which said last-named lever acts upon the actuating gear for disconnecting said pointer from its actuating gear, clutch levers operatively connected with said last-named lever, and a clutch disk with a spring constructed to liberate the pointer shaft.

4. In a machine of the character described, a pointer, measuring wheels, toothed segments, means for moving the segments upward to free them from the measuring wheels, said means embodying a lever, actuating gear for said pointer, a lever mounted upon the pivot of said first-named lever and rigid therewith, means by which said last-named lever acts upon the actuating gear for disconnecting said pointer from its actuating gear, clutch levers operatively connected with said last-named lever, a clutch disk with a spring constructed to liberate the pointer shaft, and means for returning the pointer to its zero position before the pointer shaft and its actuating gear are again connected.

5. In a machine of the character described, a pointer, measuring wheels, toothed segments, means for moving the segments upward to free them from the measuring wheels, said means embodying a lever, actuating gear for said pointer, a lever mounted upon the pivot of said first-named lever and rigid therewith, means by which said last-named lever acts upon the actuating gear for disconnecting said pointer from its actuating gear, clutch levers operatively connected with said last-named lever, a clutch disk with a spring constructed to liberate the pointer shaft, means for returning the pointer to its zero position before the pointer shaft and its actuating gear are again connected, and a stop for determining the zero position of said pointer.

WILHELM ADOLF WÜST.

Witnesses:
JEAN GRUND,
CARL GRUND.